US012031358B2

(12) United States Patent
Workman

(10) Patent No.: US 12,031,358 B2
(45) Date of Patent: Jul. 9, 2024

(54) PORTABLE SLIDING DOOR SECUREMENT DEVICE

(71) Applicant: David Workman, Carlsbad, CA (US)

(72) Inventor: David Workman, Carlsbad, CA (US)

( * ) Notice: Subject to any disclaimer, the term of this patent is extended or adjusted under 35 U.S.C. 154(b) by 23 days.

(21) Appl. No.: 17/523,761

(22) Filed: Nov. 10, 2021

(65) Prior Publication Data

US 2022/0145667 A1 May 12, 2022

Related U.S. Application Data

(60) Provisional application No. 63/111,942, filed on Nov. 10, 2020.

(51) Int. Cl.
*E05B 65/08* (2006.01)

(52) U.S. Cl.
CPC ................................ *E05B 65/0894* (2013.01)

(58) Field of Classification Search
CPC . Y10T 292/34; Y10T 292/243; Y10T 292/19; E05B 65/0894; E05B 53/001; E05B 83/40; E05C 19/18; E05C 19/184; E05C 19/188; Y10S 292/46
See application file for complete search history.

(56) References Cited

U.S. PATENT DOCUMENTS 2,463,451 A * 3/1949 Yates ................. A47G 25/0657 24/67.5
2,629,466 A * 2/1953 Nardulli .................. E05D 15/00 292/257
2,793,064 A * 5/1957 Budoff .................... E05B 85/08 292/288
3,267,613 A * 8/1966 McQuiston ......... E05B 65/0841 292/204
3,378,293 A * 4/1968 Silk ..................... E05B 65/0841 292/202
3,486,781 A * 12/1969 Crum ................. E05B 65/0888 292/262
3,490,802 A * 1/1970 Harry ................. E05B 65/0864 292/288
3,640,559 A * 2/1972 Royer ..................... E05C 17/60 49/404
3,756,641 A * 9/1973 Dugan ................ E05B 65/0894 411/910
3,869,887 A * 3/1975 Zeit ..................... E05B 65/0864 70/451
3,907,182 A * 9/1975 Bryant .................... F16B 2/185 24/516

(Continued)

FOREIGN PATENT DOCUMENTS

CA 1087148 A * 10/1980 .............. F16B 2/185
KR 101720466 B1 * 6/2016 ............. A47B 96/06

(Continued)

*Primary Examiner* — Kristina R Fulton
*Assistant Examiner* — Steven A Tullia
(74) *Attorney, Agent, or Firm* — Donn K. Harms

(57) ABSTRACT

A portable door securement device is configured for a removable compressive engagement to a track member of a sliding door track. The securement device has a locked configuration wherein a compressive engagement to the track member, prevents sliding of a door positioned on the sliding door track. The device is removable or may be relocated upon the track member while in an unlocked configuration.

6 Claims, 3 Drawing Sheets

(56) References Cited

U.S. PATENT DOCUMENTS

| | | | | | |
|---|---|---|---|---|---|
| 3,971,100 | A * | 7/1976 | Anop | E05F 5/06 | 16/80 |
| 4,062,576 | A * | 12/1977 | Jennings | E05B 65/0894 | 292/257 |
| 4,148,508 | A * | 4/1979 | Adair | E05B 65/0894 | 292/258 |
| 4,489,965 | A * | 12/1984 | Taylor | E05B 65/0864 | 292/147 |
| 6,394,510 | B1 * | 5/2002 | Stewart, III | E05B 65/0888 | 292/264 |
| 9,644,406 | B2 * | 5/2017 | Liao | E05D 13/04 | |
| 10,550,869 | B2 * | 2/2020 | Gibb | F16B 2/005 | |
| 2004/0026934 | A1 * | 2/2004 | Boda | A47B 96/06 | 292/256 |
| 2005/0193530 | A1 * | 9/2005 | Boda | F16B 12/32 | 211/113 |
| 2010/0239383 | A1 * | 9/2010 | Toutant | F16B 2/10 | 410/77 |
| 2016/0349008 | A1 * | 12/2016 | Darby | F16B 2/10 | |
| 2019/0063477 | A1 * | 2/2019 | Darby | F41C 33/00 | |

FOREIGN PATENT DOCUMENTS

| | | | | |
|---|---|---|---|---|
| KR | 101720466 | B1 * | 9/2016 | E05C 19/18 |
| WO | WO-0103537 | A1 * | 1/2001 | A47B 96/06 |

* cited by examiner

PORTABLE SLIDING DOOR SECUREMENT DEVICE

This application claims priority to U.S. Provisional Patent Application Ser. No. 63/111,942, filed on Nov. 10, 2020, which is incorporated herein in its entirety by this reference thereto.

FIELD OF THE INVENTION

The present device relates to the securing of doors providing entry to a room or building. More particularly, the disclosed device and method relate to a portable sliding door track engageable device, configured to removably engage with the door track and prevent the sliding and opening of the track mounted door, until the device is removed from engagement thereto.

BACKGROUND OF THE INVENTION

The securing of doors against unwanted entry has been a problem as long as there have been doors allowing persons into a home or business. It is well known that less than honest persons, given the opportunity, will attempt to gain entry to buildings and rooms for which they are not authorized. Such can easily lead to nefarious activity such as breaking and entering, burglary, or other crimes concerning property and theft. Further, unauthorized entry by such persons can lead to crimes involving the safety of the occupant of the room or building.

While deadbolts and extra locks and the like exist for the secondary securement of swinging doors, such is not the case for doors which slide within a track. Such sliding doors are conventionally formed from glass and provide a view into the room or building, and conventionally have less than adequate locks which can be jimmied or otherwise opened. This is especially true where the unauthorized party attempting entry through such a sliding door has experience in overcoming conventional sliding door latches.

The forgoing examples of related art of track-mounted sliding door securement and security and limitations related therewith are intended to be illustrative and not exclusive, and they do not imply any limitations on the invention described and claimed herein. Various other limitations of the related art are known or will become apparent to those skilled in the art upon a reading and understanding of the specification below and the accompanying drawings.

SUMMARY OF THE INVENTION

The sliding door securement device and system, herein disclosed and described, provides a solution to the shortcomings in prior art and achieves the above noted objects through the provision of a track engaging sliding door securing device which once engaged, prevents unauthorized entry through the sliding door to which it engages.

The device features a securing body portion formed of a first member which is engaged with a second member. The distance between the first member and the second member is adjustable to allow for adjustment of the compressive engagement of the body portion to opposing sides of a projecting track member of a sliding door track.

A foot actuated locking member is rotationally engaged with the second member and may be pivoted between a raise or unlocked position and a lowered or locked position. This locking member has a contact area having an upper surface configured for positioning a foot of the user thereon, to pivot the locking member from the upper or unlocked position to the lowered or locked position. A sidewall extending below and around this upper surface has an opening therein sized for insertion of the foot of the user therethrough.

A bottom surface of the contact area of the locking member is configured for contact with the foot of the user when inserted through the sidewall opening. The locking member may be pivoted to the raised or unlocked position by an upward force against the bottom surface of the contact area with the foot of the user extending through the opening.

This locking member, in the pivoting engagement with the second member of the body portion of the device, is especially preferred as it eliminates the need for a user to bend over and use their hand to secure or release the device from a sliding door track. The foot engageable locking member also allows the user to employ their weight to pivot the locking member to cause a compressive engagement of a raised wall of the sliding door frame within a gap located between the first member and second member of the body portion.

An adjuster is provided to allow for adjustment of the distance of the gap located between the first member and second member positioned across the gap from the first member. Currently, the adjuster is provided by rotating an adjustment screw which is in a threaded engagement with a connector positioned on the second member. Rotating the screw allows the user to increase or decrease the distance of the gap and adjust it for a compressive engagement with raised door track members defining a track in which the sliding door slides back and forth.

Positioning the locking member to the lowered position, in a current favored mode of the device, locks the second member in position in a compressive engagement against a second side surface of a track member of the track on which the sliding door slides. A facing side of the first member of the body portion, concurrently, is located to a compressive engagement against a first side surface of the track member. So engaged, sidewalls of both the first member and second member of the body portion of the device contact against a side surface of the track engaged sliding door, and thereby prevent it from moving, until the device is disengaged from the track member, by lifting the locking member.

The lock formed by the locking member is achieved through a compressive contact of a first locking component which projects through an opening in the second member and contacts against a second locking component projecting from the first member of the body portion of the device. This compressive contact prevents the second member of the body portion from moving away from the first member and maintains the compressive engagement of the two members to opposite sides of the track member which is positioned on one side of the track in which the door slides.

With respect to the above description, before explaining at least one preferred embodiment of the herein disclosed sliding door securement invention in detail, it is to be understood that the invention is not limited in its application to the details of construction and to the arrangement of the components in the following description or illustrated in the drawings. The sliding door securing device herein described and shown is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other foot actuated sliding door securing structures, methods and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. The term substantially, unless otherwise specifically defined, means plus or minus five percent.

It is an object of the present invention to provide a lightweight and highly portable locking device for a track mounted sliding door.

It is an additional object of this invention to provide such a sliding door securing device which requires no tools, fasteners, or other engagement components which would damage the door being secured.

It is yet another object of the invention, herein, to provide a sliding door securing device which is easily removed from a compressive engagement with a sliding door track by a foot of the user, thereby eliminating the need for a user to bend over or use their hands, which can be challenging for a great many users.

These and other objects, features, and advantages of the present sliding door securing invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive examples of embodiments and/or features of the disclosed track engageable sliding door locking device. It is intended that the embodiments and figures disclosed herein are to be considered illustrative of the invention herein, rather than limiting in any fashion.

Figure 3:
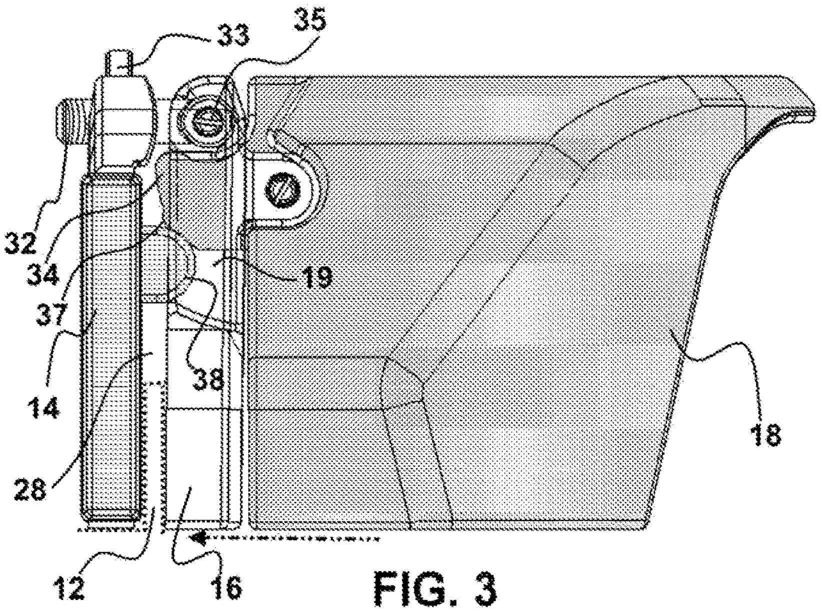

FIG. 3 displays the device from a side view showing the second member of the body portion in a transparent mode positioned across a gap from the first member of the body portion in an as-used position compressibly engaged to an upright track member on which a sliding door slides upon or adjacent thereto.

Figure 4:
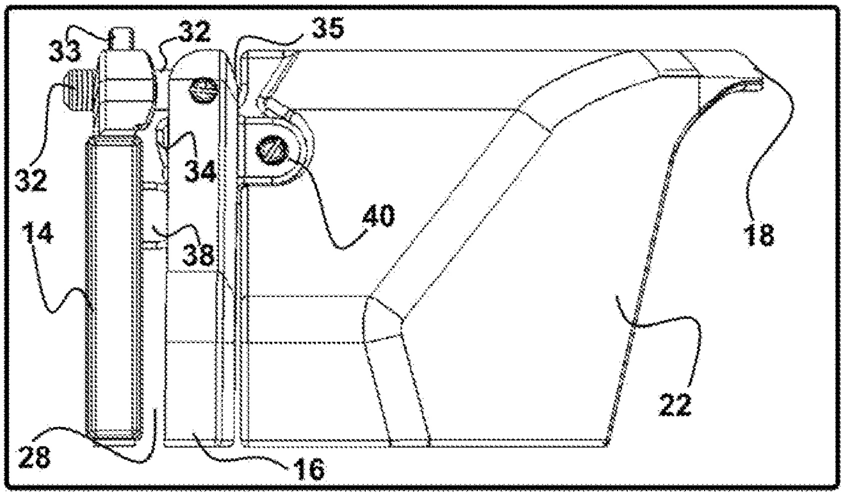

FIG. 4 shows the device, as in FIG. 3, in a line drawing mode wherein the second body portion is shown in solid form.

Figure 5:
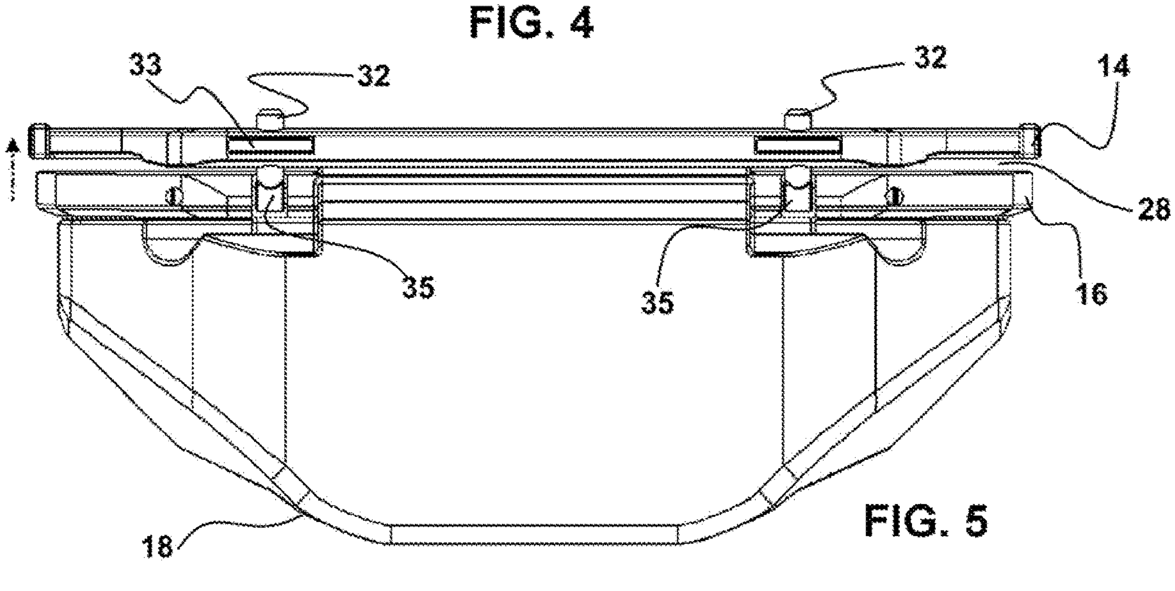

FIG. 5 depicts a top or overhead view of the device of FIGS. 1-4 showing the adjustable slot positioned between the first body portion and the body portion and showing the adjusters employable for adjusting the gap size.

Figure 6:
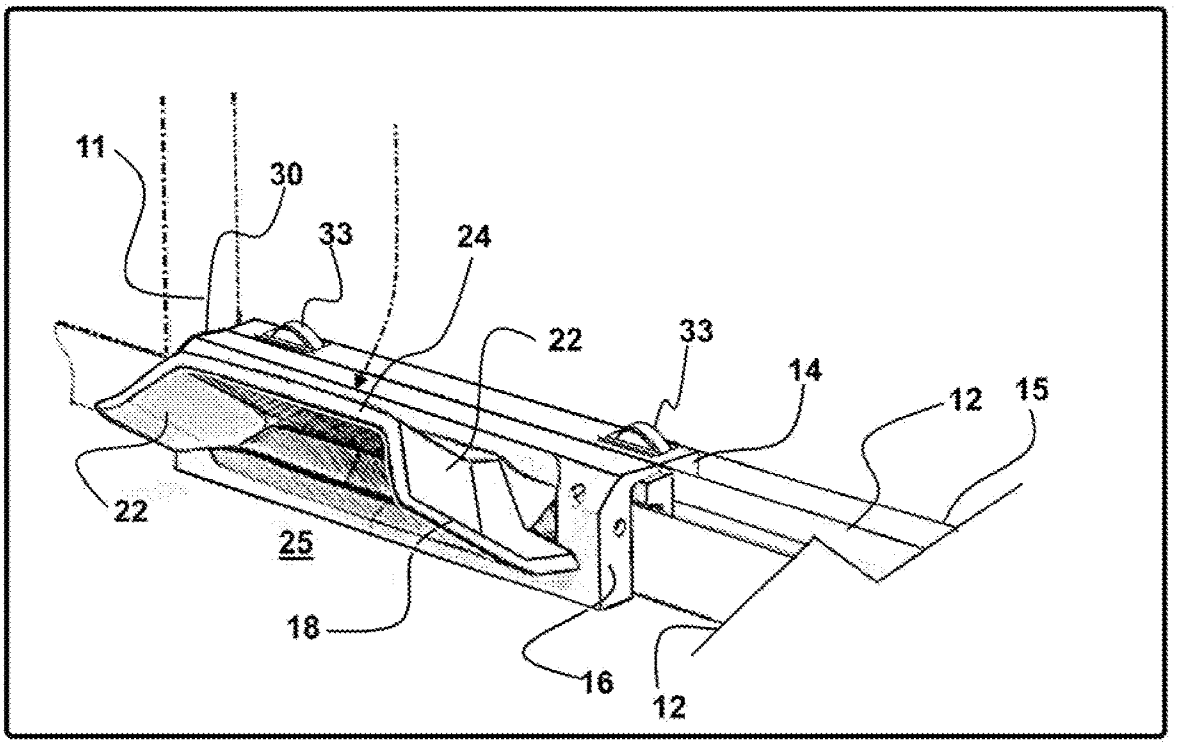

FIG. 6 depicts the device in the unlocked configuration with the locking member pivoted to a raised position wherein it is configured or operation with the foot of a user, and showing the track member slidably positioned within the gap between the first body portion and second body portion.

Figure 7:
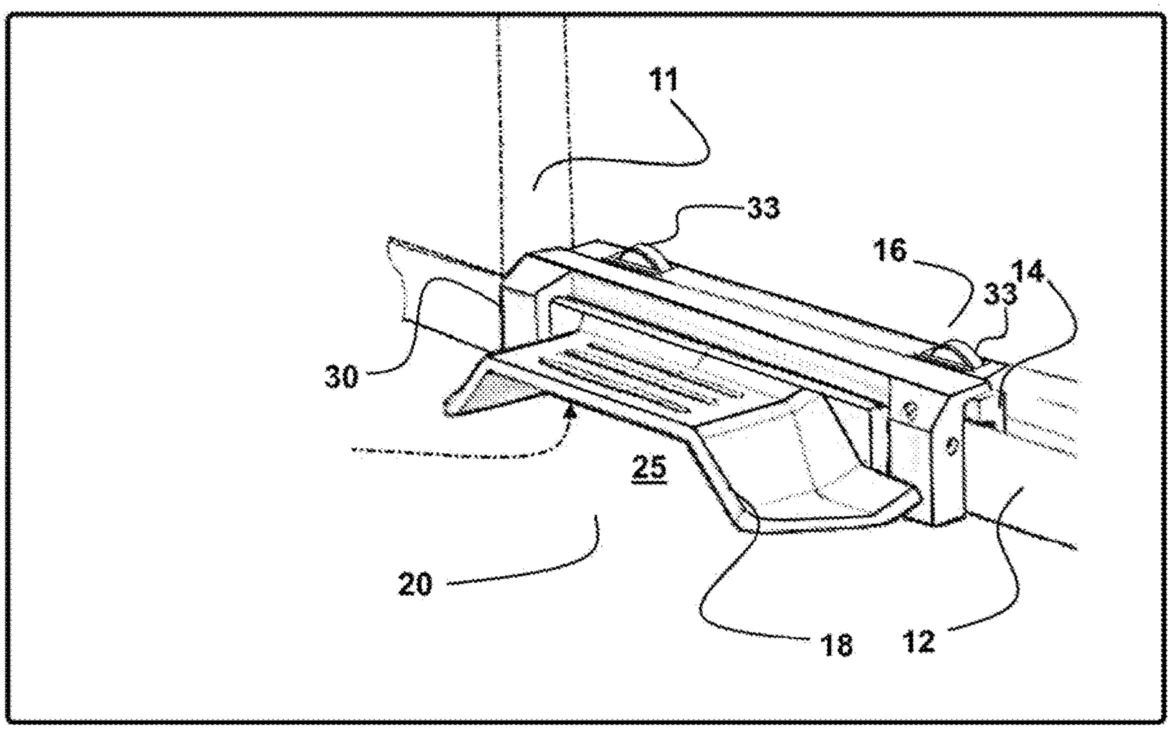

FIG. 7 shows the device, as in FIG. 6, but with the foot actuated locking member pivoted to the lowered or locked position by pressure from the foot of the user upon the top surface of the contact area of the locking member and showing the track member compressibly engaged between the first body portion and second body portion by the force exerted from the locking member against the second body portion.

DETAILED DESCRIPTION OF THE INVENTION

The device 10 and system herein disclosed and described in FIGS. 1-7 provide a solution to the shortcomings in prior art of securing sliding doors which are operatively positioned upon or in between projecting track members 12. Such sliding door tracks are well known and operate in a well known manner to provide a pathway for sliding doors and windows to open and close. With such sliding door tracks, the door is slidably positioned either in slots formed between track members 12 or atop a projecting track member 12 on which the sliding door 11 will slide between open and closed positions.

Figure 1:
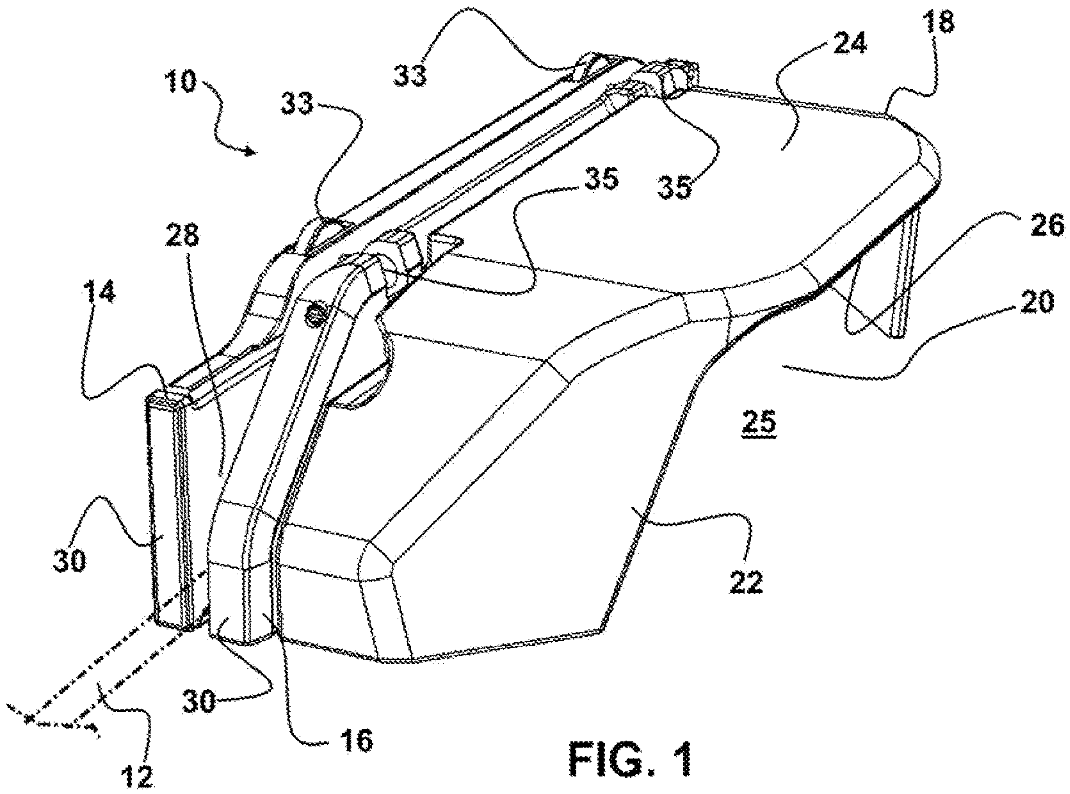
FIG. 1 depicts an overhead perspective view of the sliding door securement device, herein, having a gap operatively engaged to a track member of a sliding door track, in a locked configuration.

As can be seen in FIG. 1, showing the device 10 in an as used and locked position, the disclosed door securement device 10 herein, may be easily operatively engaged and disengaged, using no hands and just the foot of a user. In this locked position, with the track member 12 in a compressed engagement between the first body portion 14 and second body portion 16, the device 10 will prevent opening or movement of a track-positioned sliding door 11 (FIGS. 6-7) in a direction toward the device 10.

The device 10, as shown in FIG. 1, is portable and will operatively engage to any track member 12 of a conventional sliding door track 15 (FIG. 6). As noted, such tracks are well known and are employed widely in the U.S. and other countries to operatively locate a sliding door 11 to slide between an open and closed position, either atop the track member 12 on wheels or between the track member 12 and an adjacent track member 12.

As shown in FIG. 1, the device 10 is shown positioned in a locked engagement to the track member 12 of the sliding door track. By track member 12 is meant, a vertical projection from such a conventional sliding door track 15 (FIGS. 6-7) on which a sliding door 11 will slide, either on wheels traveling on the track member 12 or in a slot formed adjacent the track member 12.

In this engaged or locked position, shown in FIGS. 1, 3-4 and 10, the track member 12 is located in a compressed, sandwiched engagement in between a first body portion 14 and a second body portion 16. In the locked position, a pivoting lock member 18 has an opening 20 positioned in between a contact surface 24 and sidewalls 22 extending from that contact surface 24 of the locking member 18. This opening is configured for sliding a foot of a user therein, under the contact surface 24 of the locking member 18. With the foot of a user so located, an upward lifting of that foot in a direction away from the support surface 25 such as a floor, to a contact with a lower surface 26 of the contact surface 24, will allow the user to pivot the locking member 18 to the raised position of FIG. 2. This pivoting to the raised position of the lock member 18 will remove the force communicated by the lock member 18 against the second body portion 16, wherein the compressed engagement of the track wall 12, between the first body portion 14 and second body portion 16, is released.

Figure 2:
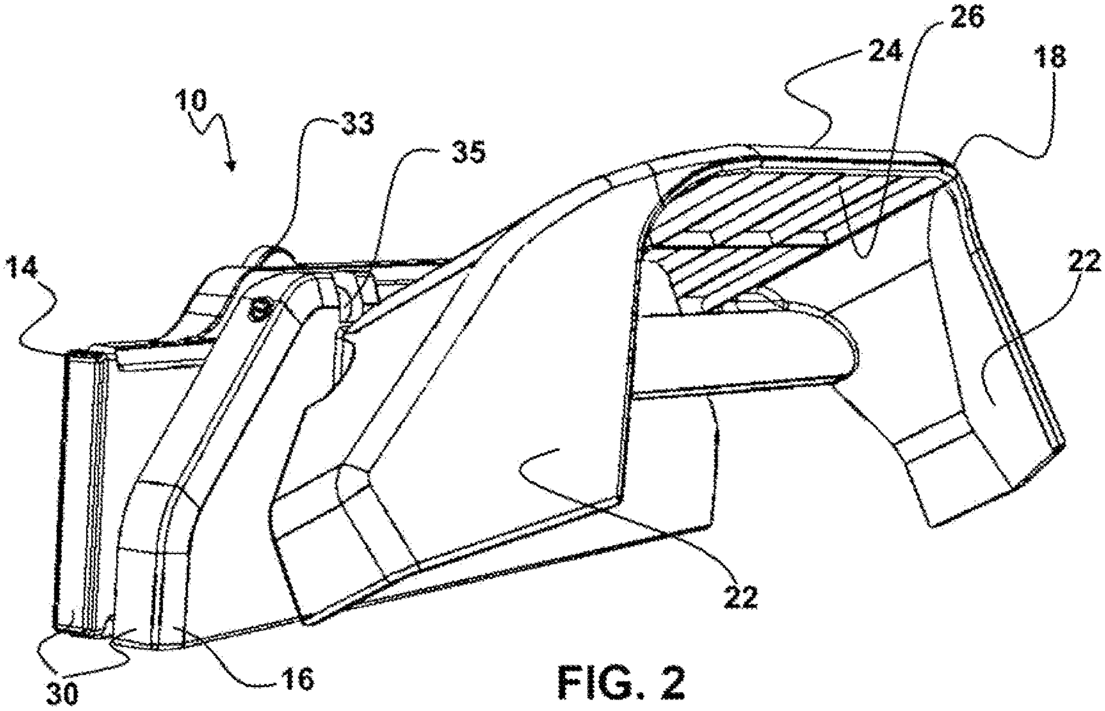
FIG. 2 shows the device of FIG. 1, in a perspective view, showing the locking member pivoted in its engagement to the second member of the body of the device, and thereby positioned in an unlocked position.

As also shown in FIG. 2, which depicts the device 10 in an unlocked configuration, the gap 28, located between the first body portion 14 and second body portion 16, is moved to a wider distance. With no compressive engagement, the device 10 will slide on or off of a track wall 12 or will slide along the track wall 12 as a sliding door 11, contacting the device 10, is moved. This allows the user to keep the device 10 engaged over a track wall 12 in an uncompressed positioning, so they may remove it or reposition it on the track wall 12 by using the door 11 to slide against it.

In this unlocked position of FIG. 2, once the device 10 is positioned with the track member 12 within the gap 28, between the first body portion 14 and second body portion 16, a depressing of the locking member 18 to pivot it to the lowered or locked position of FIGS. 1 and 3-4 will cause the first body portion 14 and second body portion 16 to compressibly engage with both side surfaces of the track member 12. This action locks the device 10 in position on the track member 12 and prevents any sliding door 11 from moving past a contact side 30 of the device 10.

The device 10 can, thus, be engaged to any locked and fixed position on a track member 12, such that the sliding door 11 can be opened slightly but prevented from opening to a point where entry by a human is possible. This can be easily done by releasing the lock member 18, such that the device 10 will slide upon the track member 12. The user can employ the door 11 to slide the device 10 to a desired position, leaving a small gap for air passage and the like. Thereafter, the user will re-lock the device 10 to the compressed engagement with the track member 12, using their foot, as noted below.

FIG. 3 is an end or side view of the device 10 showing it in the locked position of FIG. 1, wherein the track member 12 is located in the gap 28 and is positioned in a compressed engagement with and between both the first body portion 14 and second body portion 16. It is held in this compressed engagement by the force of the lock member 18 against the second body portion 16, which is in a hinged engagement 35 with the first body portion 14. This hinged engagement 35 is positioned at a second end of an adjustable connection member 32, which can be drawn toward or away from the first body portion 14 by an adjuster 33.

As shown, the adjuster 33 has a threaded cavity which is engaged with threads formed on the connection member 32 and, thus, will translate the second end of the connection member 32 and the hinged engagement 35, thereon, toward and away from the first body portion 14. This, in turn, will move the second body portion 16 toward or away from the first body portion 14 and will adjust the diameter or size of the gap 28 to a point where movement of the lock member 18 against the second body portion 16 will cause the compressed engagement upon the track member 12.

Thus, once the device 10 is positioned with the track member 12 within the gap 28, a rotation of the adjusters 33 will allow the user to move the first body portion 14 closer or further from the second body portion 16, as needed. Thereafter, rotation of the lock member 18 downward will impart a biasing force against and to the second body portion 16 toward the first body portion 14. The biasing force will significantly increase the grip of the device 10 upon the track member 12, such that the device 10 will not slide nor will the door 11 contacting against it.

The position of the hinge engagement 35 with the second body portion 16, is adjustable using the adjusters 33, which will also adjust the size of the gap 28. However, such adjustment can also be provided with other connectors, as would occur to those skilled in the art.

Also shown in FIG. 3, through a transparent sidewall of the second body member 16, is the locking mechanism which holds the first body portion 14 and second body portion 16 in the compressed engagement to the track member 12 while in this locked positioning. As shown, a first locking projection 34, extending from the lock member 18 and through a passage 19 in the second body portion 16, compressibly contacts against a second locking projection 38 extending from the first body portion 14 into the passage 19 in the second body portion 16. The compressive contact of the first locking projection 34 against an upper surface of the second locking projection 38 holds the locking member 18 in this lowered position. Concurrently, the locking member 18 contacts against a second side of the second body portion 16 and imparts a biasing force against the second body portion 16 to cause it to rotate toward the first body portion 14 and form a compressive engagement of the track member 12 within the gap 28, between a first side of the first body portion 14 and a first side of the second body portion 16.

Shown in FIGS. 4-5, the locking member 18 is in a pivoting connection 40 with the second body portion 16. As shown, a hinge projecting from the second body portion 16 engages an axle engaged to the locking member 18 but other means for a pivoting connection, which will allow for distance adjustment of the gap 28, may be employed.

Preferably, as shown in FIG. 3, the first locking projection 34 is formed as a cam which has a curved surface which slides upon a curved surface of the second locking projection 38 until a locking projection 37 extending from the curved surface of the first locking projection 34 is forced to an overhead position. This forms a locked connection of the first locking projection 34 with the second locking projection 38, which is only overcome by rotating the lock member 18 to the inclined or released position of FIG. 2, using the mechanical advantage of the lock member 18 and force of the foot or hand of the user.

FIG. 6 shows the device 10 operatively positioned in an unlocked configuration, with a track member 12 of a conventional sliding door track 15. As shown, the track member 12 is positioned in the gap 28 between the first body portion 14 and second body portion 16.

Stepping upon an upper side of the contact surface 24 of the locking member 18 will move it to the locked position shown in FIG. 7. As noted above, concurrently, the track member 12 is placed in a compressed contact with a first side of the first body portion 14 and a first side of the second body portion 16.

The device 10, in FIG. 7, is shown in this locked position. As shown, the locking member 18 has been pivoted to a lowered position wherein the contact surface 24 is preferably substantially parallel to the adjacent support surface 25 such as a floor. Such is accomplished, easily, by the foot of the user being placed on an upper side of the contact surface 24 when the lock member 18 is in the elevated position of FIG. 6.

With the device 10, in the locked position of FIG. 7, wherein the lock member 18 has been lowered by foot or other pressure, an opening 20 located between the support surface 25 and the contact surface 24 and the two sidewalls 22. This opening 20 is configured for the user to slide their foot into while sliding it against or on the support surface 25 during such sliding. This allows the user to lock and unlock the device 10 with only their foot and avoids the need to bend over or use their hands which for many users is either not possible or fraught with the potential of losing their balance.

Once the foot of the user is positioned underneath the contact surface 24, a lifting of their foot, so positioned, will rotate the lock member 18 to the elevated or unlocked position, wherein the device 10 is removable from or slidable on the track member 12. Thereafter, the door 11 may be slid to an open position. It is preferred that a gap between the support surface 25 and the lower edge or surface of the support surface 24 be between 1.5 to 4.5 inches, as experimentation has shown this allows a user with footwear on their foot to easily slide their foot into the opening 20 and lift the lock member 18 while maintaining their heel on the support surface 25 for both balance and leverage.

As noted, any of the different configurations and components can be employed with any other configuration or component shown and described as part of the device herein. Additionally, while the present invention has been described herein with reference to particular embodiments thereof and steps in the method of production, a latitude of modifications, various changes and substitutions are intended in the foregoing disclosures, it will be appreciated that in some instance some features, or configurations, or steps in formation of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

Further, the purpose of any abstract of this specification is to enable the U.S. Patent and Trademark Office, the public generally, and especially the scientists, engineers, and practitioners in the art who are not familiar with patent or legal terms or phraseology, to determine quickly from a cursory inspection the nature and essence of the technical disclosure of the application. Any such abstract is neither intended to define the invention of the application, which is measured by the claims, nor is it intended to be limiting, as to the scope of the invention in any way.

What is claimed is:

1. A portable door securement apparatus, comprising:

a door securement device having a first body portion having a first side opposite a second side;

said door securement device having a second body portion having a first side thereof opposite a second side thereof;

a hinged engagement of said second body portion with said first body portion;

a gap positioned between said first side of said first body portion and said first side of said second body portion, said gap configured for positioning upon a track member projecting vertically from an upper surface of a sliding door track having a lower surface thereof running parallel to a support surface on which it is positioned;

a locking member rotationally engaged to said second body portion;

said locking member rotatable to a locked position wherein a side surface of said locking member imparts a biasing force against a second side of said second body portion;

said biasing force generating a compressive contact of said first side of said first body portion and said first side of said second body portion to opposite sides of said track member;

a contact side of said door securement device configured to contact against a sliding door operatively positioned on said sliding door track and prevent movement thereof in a direction toward said contact side;

said locking member having an unlocked position wherein said side surface of said locking member is distanced from said second side of said second body portion;

said locking member rotatable from said unlocked position to said locked position by pushing upon an upper side of a contact surface of said locking member, in a direction toward said support surface;

said second body portion having a passage therethrough;

a first locking projection extending from said locking member;

a second locking projection extending from said first body portion;

said first locking projection communicating through said passage to a contact against said second locking projection, with said locking member in said locked position;

said contact of said first locking projection against said second locking projection forming a locked engagement of said locking member when in said locked position; and said locking member rotatable to said unlocked position by imparting a force to a lower side of said contact surface of said locking member while said locking member is in said locked position, whereby a user of said door securement device can move said locking member between said locked position and said unlocked position using a foot of said user while standing.

2. The portable door securement apparatus of claim 1, additionally comprising:

sidewalls extending from opposite ends of said lower side of said contact surface of said locking member;

an opening formed between said lower side of said contact surface of said locking member in between said sidewalls of said locking member and said support surface;

said opening configured for sliding of a foot of a user therein with said locking member in said locked position, whereby a user can move said locking member to said unlocked position by raising a toe end of their foot above said support surface while maintaining a heel end of said foot in contact with said support surface.

3. The portable door securement apparatus of claim 2, additionally comprising:

a distance between said lower side of said contact surface and said support surface with said locking member in said locked position being between 1.5 and 4.5 inches.

4. The portable door securement apparatus of claim 1, additionally comprising:

said hinged engagement of said second body portion with said first body portion being a hinge positioned upon a second end of a connection member;

an adjuster rotationally engaged with said first body portion, said adjuster connected to a first end of said connection member;

rotation of said adjuster in a first direction translating said hinge and said second body portion engaged thereto, in a direction away from said first body portion; and rotation of said adjuster in a second direction opposite said first direction translating said hinge and said second body portion engaged thereto, toward said first body portion, whereby a size of said gap is adjustable by rotation of said adjuster in either said first direction or said second direction.

5. The portable door securement apparatus of claim 2, additionally comprising:

said hinged engagement of said second body portion with said first body portion being a hinge positioned upon a second end of a connection member;

an adjuster rotationally engaged with said first body portion, said adjuster connected to a first end of said connection member;

rotation of said adjuster in a first direction translating said hinge and said second body portion engaged thereto, in a direction away from said first body portion; and rotation of said adjuster in a second direction opposite said first direction translating said hinge and said second body portion engaged thereto, toward said first body portion, whereby a size of said gap is adjustable by rotation of said adjuster in either said first direction or said second direction.

6. The portable door securement apparatus of claim 3, additionally comprising:

said hinged engagement of said second body portion with said first body portion being a hinge positioned upon a second end of a connection member;

an adjuster rotationally engaged with said first body portion, said adjuster connected to a first end of said connection member;

rotation of said adjuster in a first direction translating said hinge and said second body portion engaged thereto, in a direction away from said first body portion; and rotation of said adjuster in a second direction opposite said first direction translating said hinge and said second body portion engaged thereto, toward said first body portion, whereby a size of said gap is adjustable by rotation of said adjuster in either said first direction or said second direction.

* * * * *